(No Model.)
H. B. MAY.
TIRE TIGHTENER.
No. 289,114. Patented Nov. 27, 1883.
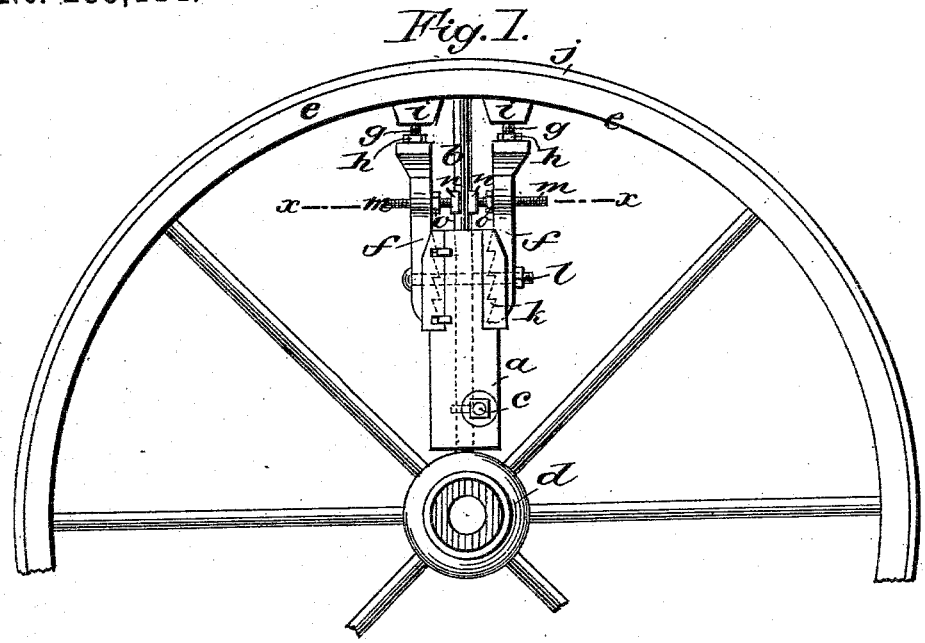
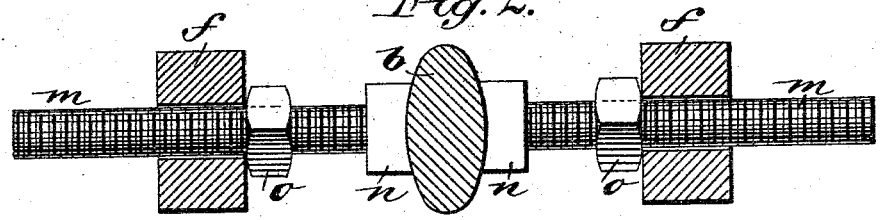
WITNESSES:
Otto Roeper
C. Sedgwick
INVENTOR:
H. B. May
BY Munn & Co
ATTORNEYS.

UNITED STATES PATENT OFFICE.

HARVEY BURGESS MAY, OF OREGON CITY, OREGON.

TIRE-TIGHTENER.

SPECIFICATION forming part of Letters Patent No. 289,114, dated November 27, 1883.

Application filed August 7, 1883. (No model.)

*To all whom it may concern:*

Be it known that I, HARVEY BURGESS MAY, of Oregon City, in the county of Clackamas and State of Oregon, have invented a new and Improved Tire-Tightener, of which the following is a full, clear, and exact description.

My invention relates to a contrivance for tightening the tire by stretching the wheel-rim by a screw-jack device to be placed between the hub and the rim of the wheel to press the rim outward by means of screws; and it consists of attachments to the said device to hold the spokes in the hub and prevent them from being drawn out of the sockets in the hub with the rim when it is stretched, all as hereinafter fully described.

Reference is to be had to the accompanying drawings, forming a part of this specification, in which similar letters of reference indicate corresponding parts in both the figures.

Figure 1 is a side elevation of a portion of a wheel, showing the application of the tightener to which my improvement is applied, together with said improvement; and Fig. 2 is a detail in cross-section of Fig. 1 on the line $x\ x$.

The screw-jack consists of the base or stock $a$, having a groove in one side to receive the spoke $b$ in it and the hook-bolt $c$ for fastening said stock to the spoke with one end resting against the hub $d$, the other end extending along the spoke about half its length, toward the wheel-rim $e$, and supporting the struts $f$, which carry screws $g$ at the outer ends, and adjusting-nuts $h$, by which the swivel-heads $i$ are to be pressed against the inner side of the wheel-rim to stretch it out tightly into the tire $j$. These struts $f$ connect with the stock $a$ by notches $k$ and a clamping-bolt, $l$, contrived to enable the struts to be set out or in to adapt the jack for wheels of different sizes.

My improvement consists of the application of the screws $m$, with concave-heads $n$ and adjusting-nuts $o$, to these struts $f$ for clamping the spokes between said screw-heads to grip and hold them, so that they will not be pulled out of the hub by the rim $e$ when it is forced out by the screws $g$, which has been an objectionable result of the use of this jack contrivance as heretofore made.

With my improvement the spokes remain in their proper positions in the hubs whether tightly fitting the sockets or not, so that when they are properly tightened up at the rim of the wheel after it has been stretched, they remain as firmly fixed in the hub as before.

Having thus described my invention, what I claim as new, and desire to secure by Letters Patent, is—

The combination of the clamping-screws $m$, having concave-heads $n$ and adjusting-nuts $o$, with the struts $f$ of a tire-tightening jack, consisting, essentially, of said struts $f$, adjusting-screws $g$, and stock $a$, substantially as described.

HARVEY BURGESS MAY.

Witnesses:
WILLIAM CAREY JOHNSON,
GEO. A. HARDING.